May 25, 1948.  H. D. TWOMBLY  2,442,104
DEVICE FOR INDICATING UNDER INFLATION OF TIRES
Filed July 30, 1945
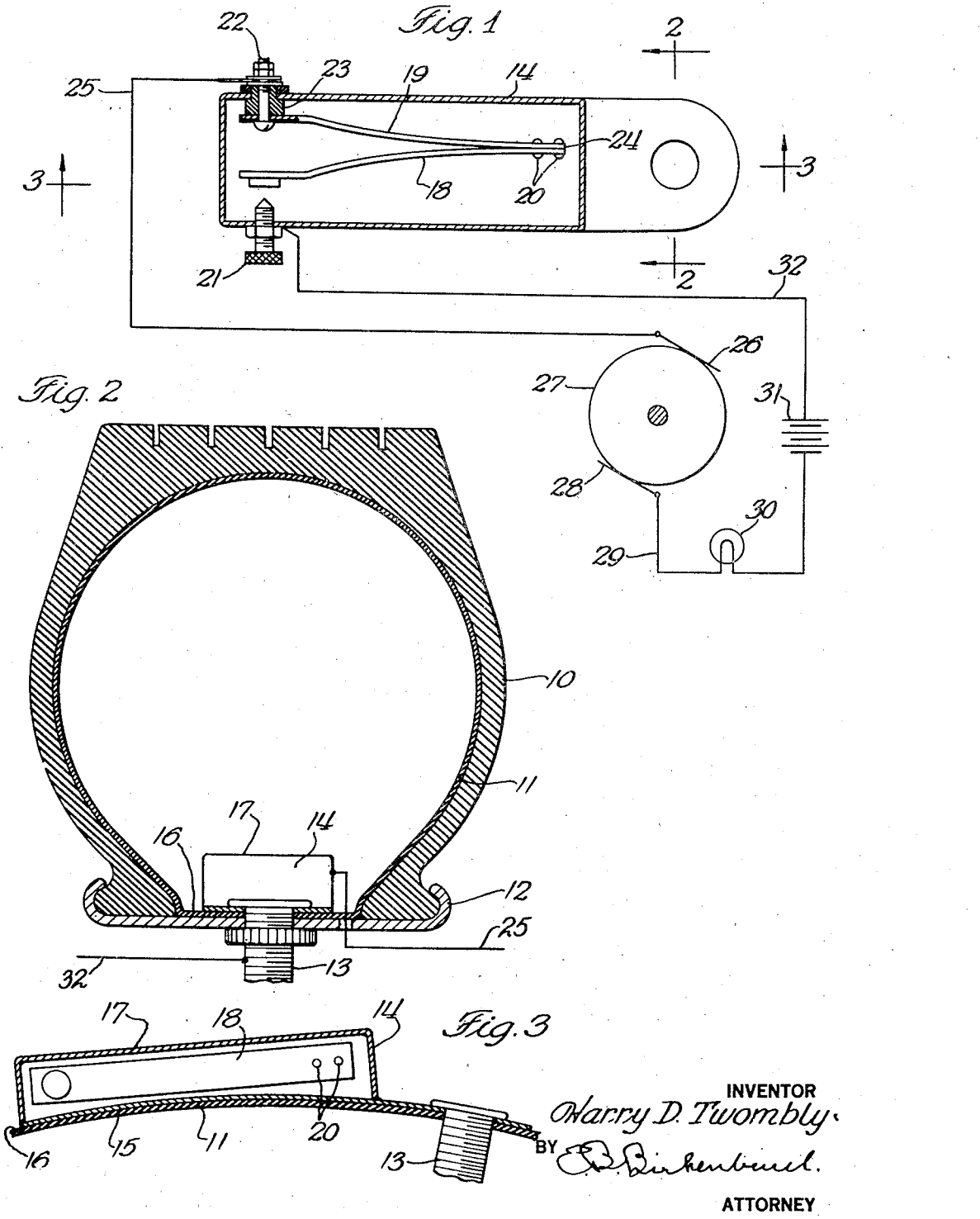
INVENTOR
Harry D. Twombly
BY
ATTORNEY Patented May 25, 1948

2,442,104

UNITED STATES PATENT OFFICE 2,442,104

DEVICE FOR INDICATING UNDERINFLATION OF TIRES

Harry D. Twombly, Portland, Oreg., assignor of one-half to Frank G. Grimes, Portland, Oreg.

Application July 30, 1945, Serial No. 607,853

2 Claims. (Cl. 177—311)

This invention relates generally to pneumatic tires and particularly to a means for indicating the under-inflation thereof.

The main object of this invention is to provide a means for automatically indicating when a tire is under-inflated, or overheated.

The second object is to provide a device of the class described in which the indication is made by heat responsive means which is exceedingly rugged in construction and yet responsive to small changes in temperature.

I accomplish these and other objects in the manner set forth in the following specification, as illustrated in the accompanying drawing in which:

Fig. 1 is a diagrammatic view showing the general arrangement of the device and showing the thermostatic element broken away in section.

Fig. 2 is a transverse section through a tire intersecting the thermostatic element along the line 2—2 in Fig. 1.

Fig. 3 is a fragmentary section taken along the line 3—3 in Fig. 1.

Similar numerals refer to similar parts throughout the several views.

Referring in detail to the drawing there is shown a common form of outer casing 10 within which is mounted the usual inner tube 11, both of which are mounted on the wheel 12. The usual form of air valve 13 is employed, but for the purpose of this invention it is illustrated as passing through the thermostatic element for positioning same.

Referring to the thermostat, same will be seen to consist of a curved hollow casing 14 preferably of a heat absorbing metal such as aluminum and having the inner curve 15 corresponding with the interior surface 16 of the inner tube 11. The top side 17 of the casing 14 is preferably flat although it may assume any other desired shape.

Within the casing 14 is mounted a double leaf bi-metallic element consisting of the parts 18 and 19 which differ from those commonly employed in that portions having equal co-efficients of expansion are in contact with each other and those portions having other co-efficients of expansion are not touching each other, the members 18 and 19 being held together by means of the rivets 20.

The member 18 bears against the adjusting screw 21 mounted in the side of the casing 14 while the member 19 is secured to the terminal 22 which is mounted in the casing 14, and insulated therefrom by means of a bushing 23. The end 24 of the members 18 and 19 is free to float within the casing 14.

The terminal 22 is connected by means of a lead 25 with a brush 26 which rides upon a contact ring 27 which may consist of the brake drum itself or a special ring mounted thereon, or on some part of the wheel upon which the tire can be mounted.

A second brush 28 rides on the ring 27 and its lead 29 is connected to the lamp 30, preferably on the instrument panel in the cab. Current is supplied to the lamp 30 from the battery 31 which is connected by means of the lead 32 to the casing 14.

While various means may be employed to accomplish this purpose, it is necessary to employ a heat responsive element which can be accurately adjusted before its insertion into the casing. In some forms of the device the thermostatic element is mounted between the inner tube 11 and the casing 10 which facilitates the insertion and removal thereof although it is somewhat less sensitive in its responsive action.

The operation of the device is as follows:

Assuming that the tire 10 is in operation and that its pressure falls below a predetermined minimum causing the walls of the casing 10 to flex objectionably thereby building up a heat within the tire 10, the developed heat is absorbed in part by the casing 14 and through the action of the elements 18 and 19 the circuit is closed through the member 30 indicating to the driver that one of his tires is under-inflated.

Of course it is immaterial which tire is under-inflated and when the tires are inspected he can readily determine which tire is under-inflated. It will be understood, of course, that each wheel is equipped with the thermostatic device and all of the leads may control the single lamp or they may be grouped for wheels, or axles or vehicles depending on the nature of installation. In some cases, it will be found desirable to employ a thermo-couple instead of a thermostat in order to indicate the temperature differences, in which case the elements might be varied but the principle employed and results obtained, remain the same. Namely, that an indication is given of a temperature increase within a tire due either to the flexing of an under-inflated tire or the over-inflating of a tire, due to its companion tire being under-inflated. While the leads 25 and 32 are shown directly connected to the brushes 28 and 26 in Fig. 1, it is obvious that the circuit must pass through the inner tube 11. This is accomplished by connecting the lead 32 to the tire valve stem 13 and passing the lead 25 through the tube 11 as shown in Fig. 2.

While I have thus illustrated and described my invention, I do not intend to be limited to such forms shown herein, but I do intend to cover all such forms and modifications thereof as fall fairly within the appended claims.

I claim:

1. In a vehicle the combination of a pneumatic tire, with an electric lamp remote from said tire, a thermostat within said tire responsive to tire temperatures and adapted to close a circuit when the tire temperature exceeds a predetermined maximum, and means for conducting current through said thermostat to said lamp for the purpose of energizing same when the tire temperature is excessive.

2. In a pneumatic wheel the combination of a rim having a pneumatic tire mounted on the outer side thereof, the inner side of said tire engaging said rim, being disposed around the median plane of said tire, a heat responsive switch disposed within said tire along said space and attached to the air inlet valve, and an electrically operated indicator controlled by said heat responsive means for indicating an over-temperature within said tire.

HARRY D. TWOMBLY.

REFERENCES CITED

The following references are of record in the file of this patent:

UNITED STATES PATENTS

| Number | Name | Date |
|---|---|---|
| 1,695,295 | Rollins | Dec. 18, 1928 |
| 1,907,540 | Hebler | May 9, 1933 |
| 1,945,017 | Beach | Jan. 30, 1934 |
| 2,159,342 | Persons | May 23, 1939 |